United States Patent [19]

Gersbeck

[11] 3,994,769

[45] Nov. 30, 1976

[54] APPARATUS FOR CONTINUOUSLY LAMINATING A CONTINUOUS STRIP OF CHIPBOARD WITH DECORATIVE FILM

[75] Inventor: Rolf Gersbeck, Hannover, Germany

[73] Assignee: Hermann Berstorff Maschinenbau GmbH, Hannover-Kleefeld, Germany

[22] Filed: Feb. 4, 1975

[21] Appl. No.: 547,014

Related U.S. Application Data

[62] Division of Ser. No. 349,684, April 10, 1973.

[30] Foreign Application Priority Data

Apr. 14, 1972 Germany ............................ 2218074

[52] U.S. Cl. ............................ 156/499; 100/93 RP; 100/176; 156/555; 156/583

[51] Int. Cl.² ...................... B30B 3/04; B32B 31/08; B32B 31/20

[58] Field of Search ........... 156/199, 309, 555, 583, 156/324, 499; 100/176, 93 RP; 425/363

[56] References Cited

UNITED STATES PATENTS

| | | | |
|---|---|---|---|
| 1,376,737 | 5/1921 | Tscheike | 156/555 |
| 3,143,454 | 8/1964 | Hannon | 156/499 |
| 3,186,889 | 6/1965 | Boldrini et al. | 156/324 |
| 3,536,549 | 10/1970 | Goerden et al. | 156/324 |
| 3,594,250 | 7/1971 | Mueller-Tamm et al. | 156/309 |
| 3,622,423 | 11/1971 | Hadley | 156/309 |
| 3,623,933 | 11/1971 | Staats | 156/555 |
| 3,627,613 | 12/1971 | Stolki | 156/309 |
| 3,650,871 | 3/1972 | Bentfors | 156/276 |
| 3,654,020 | 4/1972 | Robinson | 156/324 |
| 3,788,936 | 1/1974 | Brock et al. | 156/309 |
| 3,823,047 | 7/1974 | Colombo | 156/555 |
| 3,825,462 | 7/1974 | Ettel | 156/555 |
| 3,829,343 | 8/1974 | Remmert | 156/324 |

*Primary Examiner*—William A. Powell
*Assistant Examiner*—Basil J. Lewris
*Attorney, Agent, or Firm*—Donald D. Jeffery

[57] ABSTRACT

Apparatus for continuously laminating a continuous strip of chipboard on one or both sides with decorative film comprising means for feeding a continuous strip of chipboard between one or more pairs of rolls together with decorative film and a bonding agent. Means are provided for applying heat and pressure to laminate the decorative film and the continuous strip of chipboard together and embossing the decorative film laminated to the chipboard. In one form of the invention, the chipboard, decorative film and bonding agent may be preheated before being fed to the pairs of rolls, the rolls are preferably heated revolving drums and means can be provided for further heating the laminate before feeding the same through additional heated drums prior to embossing it.

2 Claims, 3 Drawing Figures

APPARATUS FOR CONTINUOUSLY LAMINATING A CONTINUOUS STRIP OF CHIPBOARD WITH DECORATIVE FILM

This is a division of application Ser. No. 349,684, filed Apr. 10, 1973.

The invention relates to a method for continuously laminating continuous strips of chipboard with other materials.

As it has only recently become possible to make strips of chipboard continuously no methods or apparatuses are known for continuously laminating such strips. On the other hand, from the economic point of view there is a pressing need to apply surface treatment continuously to continuously produced strips of chipboard.

According to one aspect of the invention there is provided a method of continuously laminating a continuous strip of chipboard on one or both sides with decorative film comprising feeding a continuous strip of chipboard between one or more pairs or rolls, together with decorative film with or without a bonding agent or bonding agents, applying heat and pressure to laminate the film and chipboard together and then embossing the decorative film laminated to the chipboard.

Preferably the method includes the preliminary step of raising separately or together the chipboard and the decorative film and bonding agent to the necessary temperature for laminating before feeding them between the rolls.

According to a further aspect of the invention there is provided a method of continuously laminating both sides of a continuous strip of chipboard with decorative film, comprising feeding two strips of decorative film onto respective heated revolving drums to heat the strips of film; feeding strips of bonding agent past respective radiant heaters to heat one surface of each of the strips of bonding agent; pressing the strips of decorative film and their respective strips of bonding agent onto respective ones of said heated drums by respective pressure rolls; preheating the continuous strip of chipboard by means of a heating channel; at a further position around the drums and in the nip between the drums, laminating one of the strips of decorative film onto the upper surface of the strip of chipboard and laminating the other of the strips of decorative film onto the lower surface of the continuous strip of chipboard; passing the chipboard, laminated on both sides, through a further heating channel; pressing it again in a nip between two further heated revolving drums; and feeding the laminated and pressed chipboard to an embossing machine.

Longitudinally stretched plastic sheeting may be provided as the bonding agent.

Apparatus for carrying out the method of the invention preferably includes a plurality of rolls of quite small diameter which are pressed against a drum of quite large diameter by mechanical, pneumatic or hydraulic means, the drum of quite large diameter including means whereby it can be heated.

The laminating process according to the invention may be carried out between heated rolls of equal diameter, in which case heating channels should be arranged before and between the pairs of rolls of equal diameter. The heating channels arranged before the pair of rolls will heat the chipboard to laminating temperature, and the channels arranged between the pairs of rolls will maintain the laminating temperature.

The invention is diagrammatically illustrated by way of example in the accompanying drawings, in which.

Figure 1:
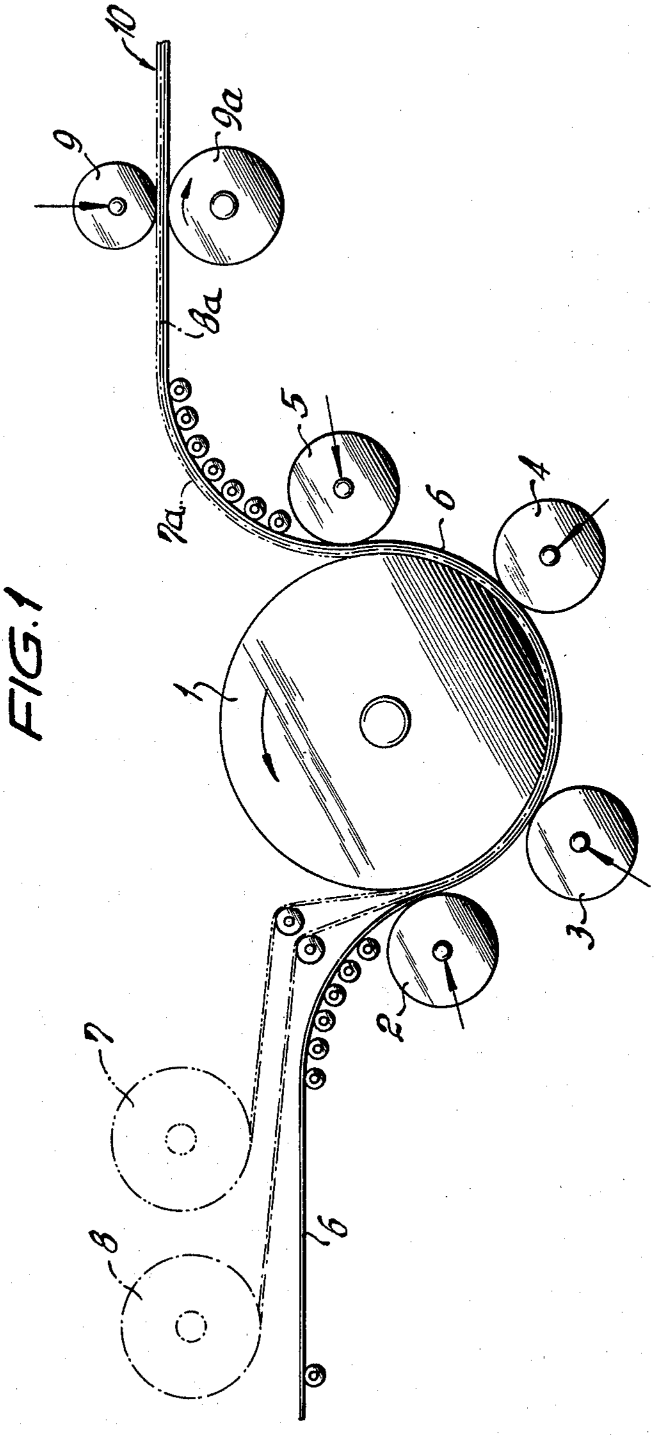
FIG. 1 is a cross-section through a first embodiment of a laminating machine for carrying out the method according to the invention.

Referring to FIG. 1, a drum 1 is heated and rotated in the direction shown by the arrow. Pressure rolls 2 to 5 are circumferentially spaced around the drum, are freely rotatable and can be pressed against the drum 1 in directions indicated by the arrows on the rolls 2 to 5.

A thin continuous strip of chipboard 6, together with a continuous strip of bonding agent fed from a reel 8 thereof and a continuous strip of decorative film fed from a reel 7 thereof, are fed together into the nip between the heated drum 1 and the pressure roll 2. Since the drum 1 is heated and the roll 2 pressing thereagainst, the film is heat-sealed onto the chipboard. This laminating process is repeated at the nips between each of the pressure rolls 3, 4 and 5, and the heated drum 1. Chipboard 10, laminated on one of its sides with decorative film with interposed bonding agent 8*a*, is then matt finished or embossed in apparatus 9, 9*a*, the particular form of the apparatus 9, 9*a*, depending on the material of which the decorative film is made.

Figure 2:
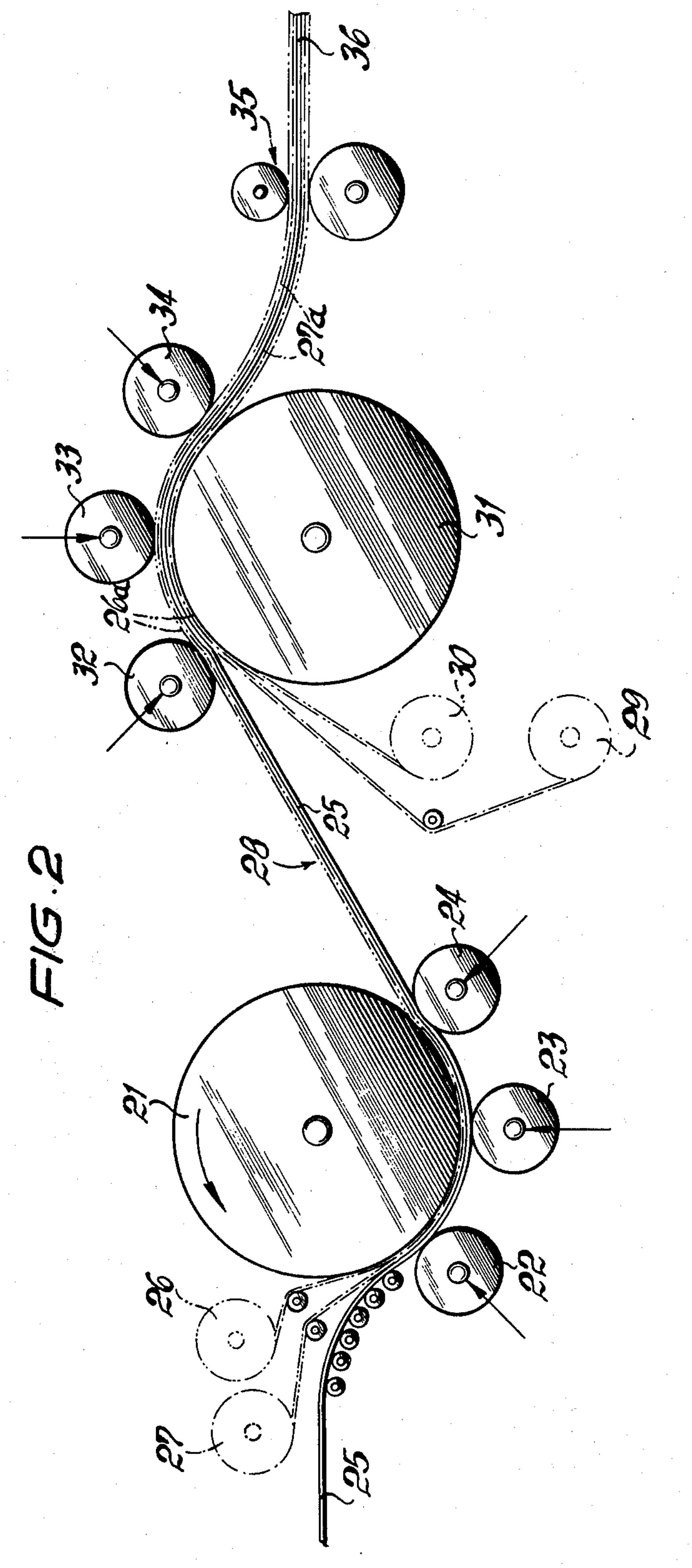
FIG. 2 is a cross-section through a second embodiment of a laminating machine for carrying out the method of the invention.

FIG. 2 shows somewhat similar apparatus for laminating a continuous strip of chipboard 25 on both of its sides with decorative films from reels thereof 26 and 30 using bonding agents from reels 27 and 29. Drums 21 and 31 are heated and the strips of chipboard 25 together with the materials from the reels 26, 27 to be laminated are fed into the nip between the heated drum 21 and pressure rolls 22, 23 and 24. A strip 28 so formed, i.e. chipboard, laminated on one of its sides with decorative film, is then fed into the nip between the heated drum 31 and pressure rolls 32, 33 and 34. A strip 36 so formed, i.e. chipboard laminated with decorative film 26*a* on both of its sides, and secured by bonding agent 27*a*, is then passed through an embossing machine 35 and is finally fed to a cutting and stacking means (not shown).

Figure 3:
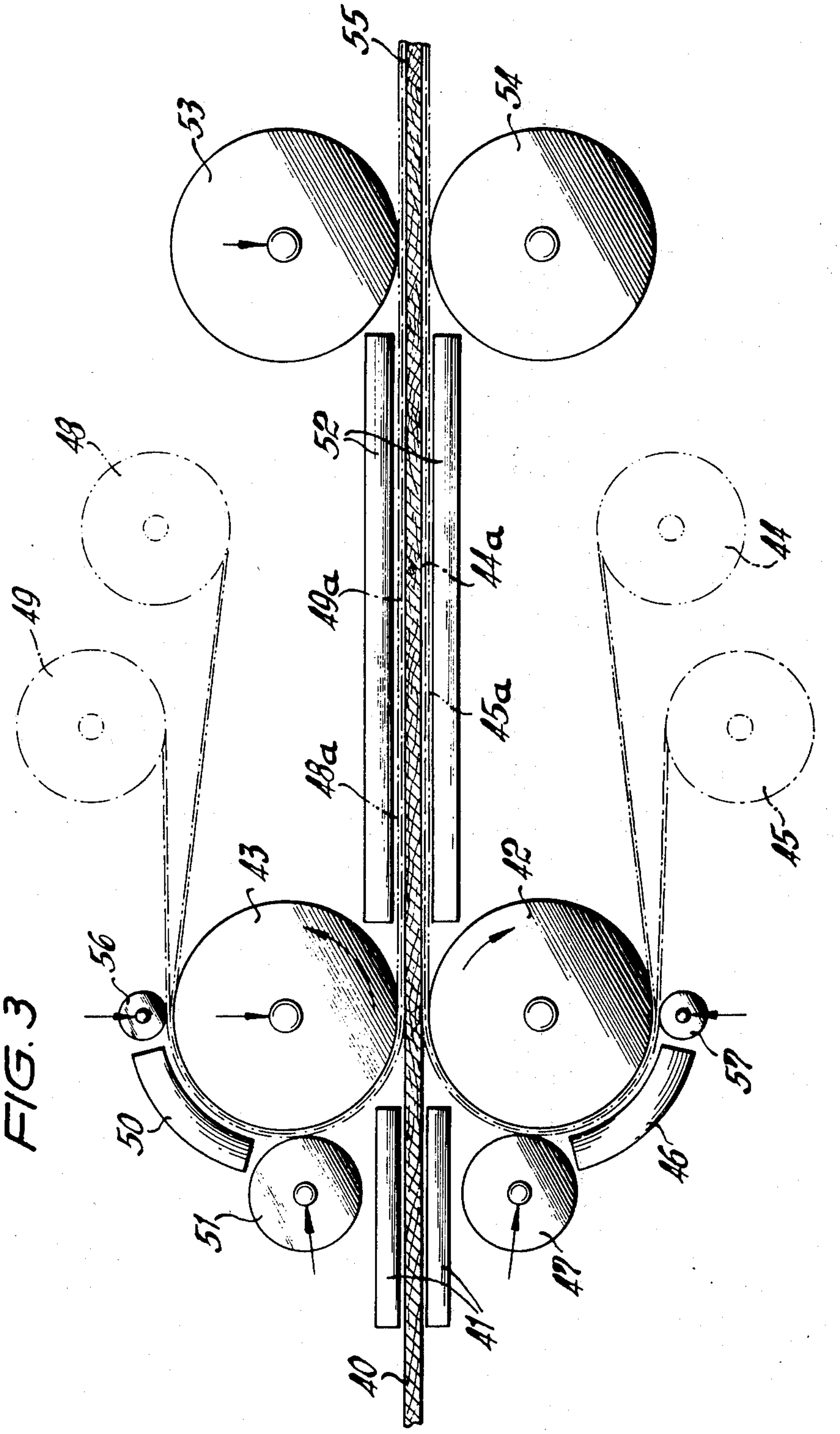
FIG. 3 is a cross-section through a third embodiment of a laminating machine for carrying out the method according to the invention.

The apparatus shown in FIG. 3, is a preferred apparatus for carrying out the method of the invention, and comprises a pair of drums 42 and 43 and a pair of drums 53 and 54, both drums of each pair being heated. A heating channel 41, for example a microwave heating channel, permits a strip of chipboard 40 to be laminated to be rapidly heated.

A strip of decorative film is unwound from a reel 48 and a continuous strip of bonding agent from a reel 49 are fed together into the nip between the drum 43 and a pressure roll 56. The two strips from the rolls 48, 49 are preheated by a radiant heater 50 and the heated drum 43 and are again compressed in the nip between a temperable pressure roll 51 and the drum 43. They are then passed further round the drum 43 and laminated onto the upper surface of preheated chipboard 40 at the nip between the heated drums 42 and 43.

In order to laminate the underside of the chipboard 40 a strip of decorative film is likewise unwound from a reel 44 and a strip of bonding agent from a roll 45.

The strips are pressed onto the drum 42 by a pressure roll 57, preheated by a radiant heater 46 and the heated drum 42, again compressed at the nip between the drum 42 and a temperable pressure roll 47 and laminated to the underside of the chipboard 40 at the nip between the heated drums 42 and 43. The drums 42 and 54 may be pressed against the drums 43 and 53 respectively by known devices (not shown) variable according to the material being laminated.

The strip of chipboard 40, laminated on one side with bonding agent 49*a* and decorative strip 48*a*, and on the other side with bonding agent 45*a* and decorative strip 44*a* is then passed through a further heating channel 52, for example another microwave channel, in order to maintain the laminating temperature. The laminating process is repeated at the nip between the heated drums 53 and 54 to produce a product 55 which is subsequently embossed in apparatus not shown. Further repetition of the laminating process at the nips between additional heated drums may be required before the embossing is effected, depending upon the nature of the materials to be laminated to the chipboard.

Temperature adjustment when laminating different materials is known, both in respect of the temperature of the laminating drum and that of the radiant heaters 46 and 50 and heating channels 41 and 52. If, for example, the decorative film is a sheet of paper, the temperature selected will be different to that which would be selected for a fabric or plastics material.

Possible decorative films for lamination to the chipboard include printed paper, webs of cloth and other fabrics, non-woven fabrics and strips of plastics, depending on the use to which the laminate is to be put and the appearance desired.

It is preferable for the bonding agents to be used in strip form, e.g. in the form of longitudinally stretched plastic sheeting, since when these are heated they become taut and thus guarantee excellent adhesion or heat-sealing between the decorative film and the chipboard without any bubble formation. Alternatively, the chipboard to be laminated may be treated with a liquid bonding agent by means of a spreader before the laminating process. The choice of bonding agent used in individual cases will depend largely on the material being laminated.

The decorative film could already be treated with a bonding agent in order to dispense with the reels 44 and 49.

What is claimed is:

1. Apparatus for continuously laminating both sides of a continuous strip of chipboard with thermoplastic, decorative film, comprising:

a. first and second heated revolving drums spaced from each other so as to define a gap between which the chipboard can pass for adhering the film to the chipboard, b. means for supplying a continuous strip of chipboard to said gap, including heater means for preheating said chipboard prior to entering said gap, c. first and second pressure rolls positioned adjacent each of said heated drums, said rolls being of relatively small diameter when compared with the diameter of said drums and being spaced circumferentially of said drums, d. means for independently supplying strips of a thermoplastic decorative film and a bonding agent to the nip formed by said first pressure roll and each of said heated drums whereby said heated drums activate said bonding agent and said pressure rolls press said strips of said film and bonding agent against the surface of said heated drums, and, e. preheater means disposed between each pair of first and second pressure rolls for further heating said strips of bonding agents and film thereby to enhance the lamination of said film on both sides of said chipboard.

2. The apparatus of claim 1 further including heater means downstream of said drums for maintaining the laminating temperature, and a second pair of heated revolving drums between which said heated laminate passes for augmenting the bonding process.

* * * * *